US00RE37434B1

(19) United States
(12) Reissued Patent
Onari et al.

(10) Patent Number: US RE37,434 E
(45) Date of Reissued Patent: Nov. 6, 2001

(54) CONDITION ADAPTIVE-TYPE CONTROL METHOD FOR INTERNAL COMBUSTION ENGINES

(75) Inventors: Mikihiko Onari, Kokubunji; Teruji Sekozawa, Kawasaki; Motohisa Funabashi, Sagamihara; Takeshi Atago, Katsuta, all of (JP)

(73) Assignee: Hitachi, Ltd., Tokyo (JP)

(21) Appl. No.: 07/482,508

(22) Filed: Feb. 21, 1990

Related U.S. Patent Documents

Reissue of:
(64) Patent No.: 4,853,720
Issued: Aug. 1, 1989
Appl. No.: 07/046,388
Filed: May 6, 1987

(30) Foreign Application Priority Data

May 9, 1986 (JP) ..... 61-104650

(51) Int. Cl.[7] ..... F02D 9/02
(52) U.S. Cl. ..... 364/431.07; 123/350
(58) Field of Search ..... 364/431.07, 431.04, 364/424.01, 424.02, 426.01; 123/350, 352, 351, 395

(56) References Cited

U.S. PATENT DOCUMENTS

| | | | | |
|---|---|---|---|---|
| 4,551,802 | * | 11/1985 | Smyth | 364/424.1 |
| 4,597,049 | | 6/1986 | Murakami | 364/413.07 |
| 4,829,434 | | 5/1989 | Karmel et al. | 364/413.07 |

FOREIGN PATENT DOCUMENTS

| | | | |
|---|---|---|---|
| 2151048 | 7/1985 | (GB) | 364/431.07 |
| 2151049 | 7/1985 | (GB) | 364/431.07 |

* cited by examiner

*Primary Examiner*—Henry A. Bennet
(74) *Attorney, Agent, or Firm*—Antonelli, Terry, Stout & Kraus, LLP

(57) ABSTRACT

To perform the proper control conforming to the intent of a driver of an automotive vehicle under any condition which is encountered by the vehicle, optimum control methods are preliminarily classified in accordance with categories relating to conditions of the vehicle and categories relating to intents of the driver and the classified optimum control methods are stored in a memory, thereby selecting one of the control methods corresponding to the combination of the categories to which the vehicle condition and the driver's intent detected during the running of the vehicle belong.

49 Claims, 4 Drawing Sheets

FIG. 4

| DRIVER'S INTENT / VEHICLE CONDITION | TORQE TRANS-MISSION | BRAKING $\theta_{br}>0$, $\theta_{ac}=0$ | TRANSIENT, COASTING $\theta_{br}=0$, $\theta_{ac}=0$ | $\theta_{ac}>0$: DECELERATION $\dot{\theta}_{ac} \leq \dot{\theta}_{acd}$, $N \geq N_d$ | $\theta_{ac}>0$: RUNNING $\dot{\theta}_{acd} < \dot{\theta}_{ac} < \dot{\theta}_{aca}$ | $\theta_{ac}>0$: ACCELERATION $\dot{\theta}_{ac} \geq \dot{\theta}_{aca}$, $N \leq N_a$ |
|---|---|---|---|---|---|---|
| —— | OFF | 5 IDLE SPEED CONTROL | | 4 A/F RATIO CONTROL (RACING) | | |
| REST $v=0$ | ON | MT : —(ENGINE STOP) AT : ISC | | —— | | 1 ACCELERATION CONTROL |
| ACCELERATION · RUNNING · DECELERATION $v>0$ | ON | 2 DECELERATION CONTROL | | 4 A/F RATIO CONTROL | (CRUISIN CONTROL SELECTION) | |
| | | 3 FUEL CUT-OFF CONTROL | | | | |

EXPLANATION $\theta_{ac}$ : ACCELERATOR PEDAL ANGLE $\dot{\theta}_{ac}$ : ACCELERATION RATE $\theta_{br}$ : BRAKE PEDAL ANGLE v : VEHICLE SPEED

N : ENGIN SPEED

AFFIXED a : CONSTANT RELATING TO ACCELERATION

AFFIXED d : CONSTANT RELATING TO DECELERATION

CONDITION ADAPTIVE-TYPE CONTROL METHOD FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

The present invention relates to a method for controlling a fuel injection system and an ignition system in an internal combustion engine, and more particularly to a control method for the internal combustion engine of an automotive vehicle which is well suited to meet the driver's various requirements relating to the driving of the vehicle.

Heretofore known electronic fuel injection control systems employ a method of intermittently supplying the fuel in an amount corresponding to the intake air flow rate and also varying the fuel quantity during the period of acceleration and deceleration (refer the below-mentioned (1) and (2)). During constant speed driving, this method can supply the engine with an amount of air and a fuel quantity which are proportional to the load and therefore there is no inconvenience. However, the method is disadvantageous in that the engine cannot be controlled properly during transient conditions, e.g., times of acceleration and deceleration.

As described above, the conventional control systems have been unable to provide satisfactory functions to meet the highly sophisticated and diversified requirements relating to driving performance. On the other hand, while torque servo controls and speed servo controls are proposed (e.g., the below-mentioned techniques (3) and (5)) to meet sophisticated requirements, no satisfactory consideration has been given to an overall control ensuring proper control under all conditions which are encountered by the vehicle.

Note that the prior art techniques relating to these types of systems include the following, for example.

(1) IDEI: "The Engine Controls", Institute of Electrical Engineers of Japan Journal Vol. 101, No. 12, P. 1148 (December 1981) . . . Controls by Microcomputers; This relates to table look-up systems.

(2) NAGAYAMA et al: Centralized Control of Engine by Microcomputers, Systems and Controls, Vol. 24, No. 5, P. 306 (May 1980); This relates to flow charts of engine operations, fuel injection control, ignition timing control and idling speed control.

(3) T. TABE et al: On the Application of Modern Control Theory to Automotive Engine Control, IECOM '85; This relates to torque servos.

(4) JP-A-57-73836

(5) ITO: "Fuel Economy Optimalizing Control System with Compound Control Action on Engine and Transmission", Automotive Engineering, February 83; This relates to speed servos.

The above-mentioned conventional techniques have failed to give due consideration in comprehensively grasping as a system the control of the engine on a vehicle. Thus, there have been a lack of engine control methods which could meet all the situations in which the vehicle is to be used and the difficulty to establish the necessary parameters for such engine control methods has been a disadvantage.

One reason is that the conventional engine control methods are made up of static models despite the fact that the conditions which are encountered by a vehicle are a repetition of steady-state operations, e.g., the constant speed running and idling operation and the transient state operation such as acceleration and deceleration. Moreover, the requirements for the behaviour of the vehicle during the transient conditions have become increasingly severe on the part of the users of the vehicles. As a result, even if measuring devices are installed to observe the transient conditions, their full utilization cannot be ensured by the static model.

In the case of the conventional methods in which the static control model is compensated for the transient conditions, a great deal of manhours are required to materialize and adjust an engine control method for each of different types of vehicles which are diversely different in vehicle characteristics, measuring devices, actuators, etc.

SUMMARY OF THE INVENTION

With a view to overcoming the foregoing deficiencies in the prior art, it is an object of the invention to provide a method of controlling an internal combustion engine mounted on a vehicle in which different vehicle conditions and driver's different intents are respectively discriminated and divided into categories so as to select a proper one of a plurality of engine control methods corresponding to each of various combinations of the categories.

To adapt the dynamic characteristic of the vehicle to the sensitivity or fancy of the driver, it is only necessary to discriminate and classify the preferences of the driver into certain preference modes, such as, sporty, luxury and economy modes of driving and change the parameters of the respective control methods to suit the corresponding modes. To realize the selection of the engine control methods corresponding to the above discrimination and classification, it is only necessary to develop the software of the computer incorporated in the engine control system in such a manner that a higher priority level is allocated to allow execution of the condition discriminating and classifying function in preference to the other functions.

The discrimination and classification of the vehicle's conditions and driver's intents are performed in the following way. The conditions of the vehicle can be detected in terms of the vehicle speeds and vehicle speed changes. The driver indicates an intent concerning the driving by engaging the torque transmission mechanism (the clutch and the transmission) and depressing the brake pedal or the accelerator pedal. In other words, the driver indicates his intent in correspondence to the situation of the vehicle by selectively depressing the two pedals. The intent is represented by the angles and angular velocities of the pedals and their time series loci. The conditions of the vehicle and the intents of the driver can be detected in detail in accordance with the measured values from a certain prior time up to the present time as to the vehicle speed and its time rate of change and the angle and angular velocity of the brake and accelerator pedals. The angular velocity of the accelerator pedal is equivalent to the acceleration rate $\dot{\theta}ac$ in FIG. 4. In addition, by utilizing these measured values, it is possible to estimate the condition of the vehicle and the intent of the driver and predict the future condition of the vehicle.

As regards the construction of the running controls of the vehicle, as will be described later with reference to the illustrated embodiments, there are a method of realizing the controls by a cascade connection of torque servo system, speed servo system and tracking servo system and another method of preparing the previously mentioned various engine control methods in a parallel manner.

The method of determining the preferences of the driver for vehicle operation may, for example, be to provide three selector switches respectively corresponding to the "sporty", mode placing emphasis on drivability, "luxury" mode placing emphasis on driving comfortability and "economy" mode placing emphasis on practicality so that the parameters of each engine control method are changed in response to the selection of one of the selector switches.

The computer used for realizing the abovementioned method may be of the high type speed and the operation program may be prepared such that the condition discrimination and the selection of the engine control methods are effected most preferentially.

BRIEF DESCRIPTION OF THE DRAWINGS

FIG. 4 is a diagram showing the relation between the vehicle conditions and the driver's intent and the respective engine control methods.

DESCRIPTION OF THE PREFERRED EMBODIMENTS

Figure 1:
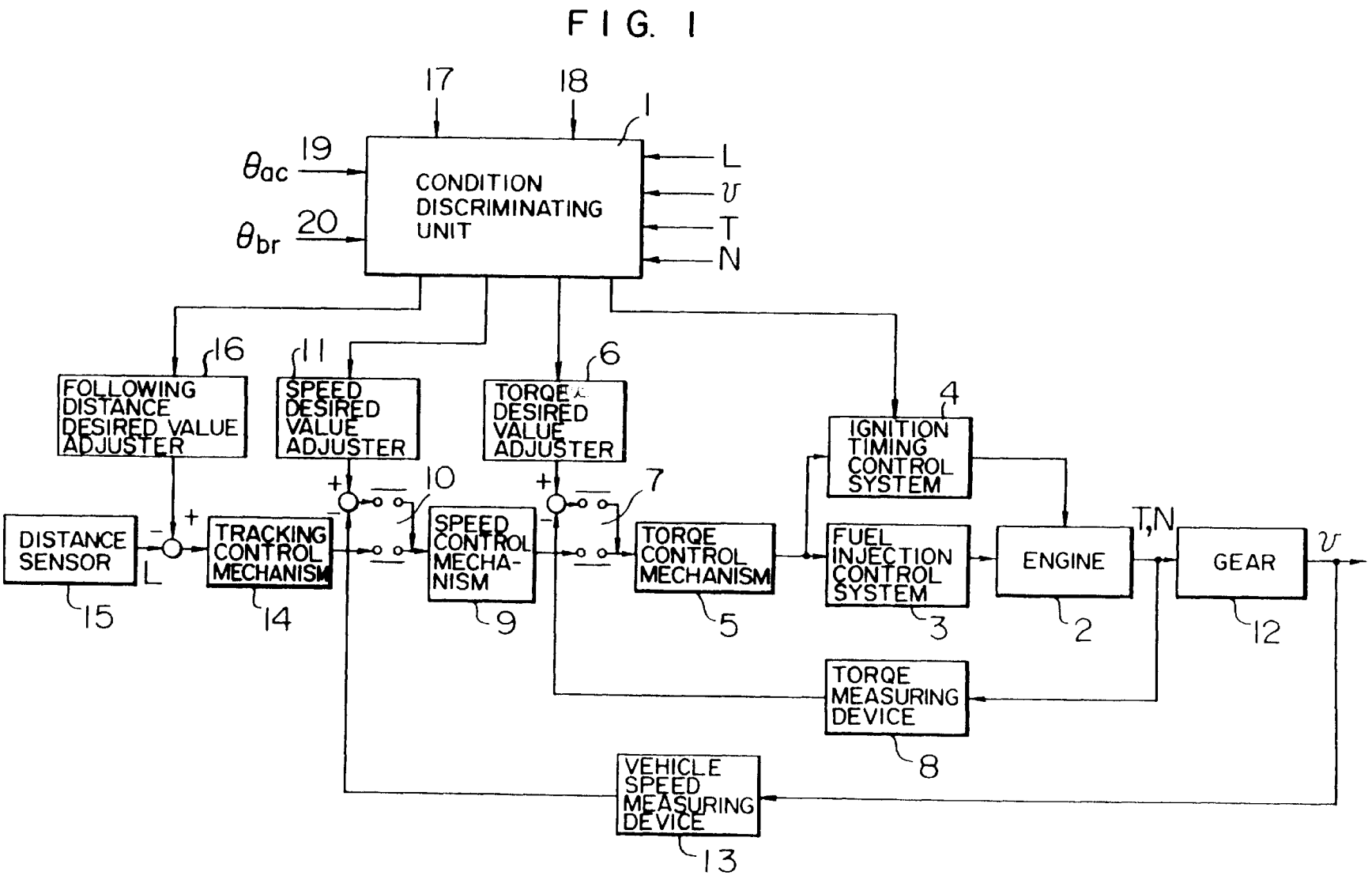
FIG. 1 is a block diagram showing an embodiment of the invention.

The principle of the present invention will now be described first with reference to FIG. 4.

FIG. 4 shows the discrimination and classification of the vehicle conditions and driver's intent and engine control methods corresponding to the respective categories.

The vehicle conditions are roughly divided into a rest condition (V=0) and a running condition (V>0). The driver's intent is discriminated on the basis of six different conditions including the operation state of the torque transmission mechanism (clutch) the depression of the brake pedal (breaking, $\theta br>0$), non-depression of the brake pedal ($\theta br=0$) and the accelerator pedal (coasting, $\theta ac=0$) the depression of the accelerator pedal (acceleration, the $\theta ac \geqq \theta aca$) the depressed accelerator pedal (steady running, $\theta acd<\theta ac<\theta aca$) at rest steady running, $\dot{\theta}acd<\dot{\theta}ac<\dot{\theta}aca$) and the restored accelerator pedal (deceleration, $\dot{\theta}ac \leqq \dot{\theta}acd$).

When the torque transmission mechanism is on (engaged) and the accelerator pedal is depressed, a control for the acceleration requirement is performed ([1] in FIG. 4). With the vehicle running, when the accelerator pedal is released and the brake pedal is depressed, a deceleration control is performed ([2] in FIG. 4). At this time, if the idle switch is on (which indicates that the acceleration pedal is released) and the engine speed is excessively high, a fuel cut-off control is performed ([3] in FIG. 4).

In the running condition, if the vehicle is neither accelerated nor decelerated, an air-fuel ratio control is performed to maintain the air-fuel ratio at a desired value ([4] in FIG. 4).

When the torque transmission mechanism is off, an idle speed control comes into action to control the engine speed to maintain it at a desired value ([5] in FIG. 4). At this time, if the accelerator pedal is depressed, the switching to the previously mentioned air-fuel ratio control is effected despite the fact that the engine is racing.

The method of discriminating and classifying the conditions of the vehicle and the intents of the driver to select the proper engine control method is well suited to progressively deal with the diverse requirements of the user of the vehicle and the introduction of new techniques which meet the requirements. To the design and development engineer as well as persons who attend matching of the engine control methods with the actual vehicle (the adjustment of the parameters), this means advantages that it is necessary to understand only the engine control methods corresponding to the required categories, that a modification of the computer program requires only the modification of some modules and so on.

An embodiment of the invention will now be described with reference to FIG. 1. The block diagram of FIG. 1 comprises a condition discriminating unit and cascaded control systems operable in response to the outputs of the former.

The conditions discriminating unit 1 detects the conditions of a vehicle in terms of a vehicle speed v, engine speed N, engine output torque T and a distance L between the vehicle and an obstacle ahead or the preceding vehicle and it also detects the intent of the driver in accordance with the changes in time (dynamic changes) obtained by operating on a signal 20 indicative of the brake pedal angle $\theta_{br}$, a signal 19 indicative of the accelerator pedal angle $\theta_{ac}$ and their past values. In accordance with these detection results and the preference of the driver, a determination is made as to which of the engine control methods is required and the decision of the construction of the cascade-connected running control systems, the selection of parameters and the modification of their values are performed.

The running control systems include the torque servo system, speed servo system and tracking servo system which are cascaded from the inner side near to an engine 2 so as to control its speed N and torque T.

The supply of fuel to the engine 2 is effected by a fuel injection control system 3 and the ignition timing is controlled by an ignition timing control system 4.

A torque control mechanism 5 determines fuel quantity and ignition timing corresponding to a torque deviation required by the control systems and the results are applied to the fuel injection control system 3 and the ignition timing control system 4. While the ignition timing control system 4 operates in accordance with the ignition timing determined by the torque control mechanism 5 at the low speed operation and the constant speed driving, during the transient period the ignition timing can be controlled directly if the condition discriminating unit 1 requires a rapid surge preventive measure.

When the torque servo system is selected by the condition discriminating unit 1, its reference value is applied to a torque reference setup unit 6 from the condition discriminating unit 1. Thus, the input to the torque control mechanism 5 represents the difference value between the torque reference value and the measured value of the engine torque. A torque servo system selector switch 7 is selected in accordance with the result of the decision in the condition discriminating unit 1. A torque measuring device 8 performs the operation of engineering value conversion and smoothing on the measured value of the torque. Where the upstream speed servo system is selected, the input to the torque control mechanism 5 is the output of a speed control mechanism 9.

Where the driving involves a frequent repetition of acceleration and deceleration, the driver demands an increase in the torque by depressing the accelerator pedal and commands a decrease in the torque by releasing the depression. Thus, the condition discriminating unit 1 applies a torque desired value corresponding to the movement of the accelerator pedal and engine speed. Alternatively, a torque deviation may be directly applied to the torque controlling mechanism 5.

When the condition discriminating unit 1 selects the idle speed control (ISC) or the driver selects the constant speed driving (cruising) control, the condition discriminating unit 1 selects a selector switch 10 so that the vehicle speed reference value applied to a speed reference setup unit 11 from the condition discriminating unit 1 is compared with the actual measured vehicle sped and the speed controlling mechanism 9 controls the vehicle speed to approach the reference value. The actual vehicle speed is measured by a vehicle speed measuring device 13 in which the axle speed derived from the engine 2 through a gear 12 is corrected for variation in the tire diameter, etc., and the resulting time series data is smoothed out.

Even if the cruise control has been selected, when the driver depresses the accelerator pedal, the switch 7 is turned on and the switching to the torque servo system is effected.

Where the vehicle is provided with a sensor for measuring the distance from an [obstalcle] *obstacle* ahead, a signal [17] from a cruising speed selector switch [(not shown)] *17* is selected so that when the distance from the preceding vehicle is less than an allowable value, the switching is made from the speed servo system to the tracking servo system.

A tracking control mechanism 14 determines an increase or decrease in the vehicle speed in accordance with the difference between the measured value from a distance sensor 15 for measuring the distance from an obstacle ahead and the predetermined following distance reference value corresponding to the vehicle speed and the result is applied to the speed control mechanism 9. The following distance reference value is determined by the condition discriminating unit 1 and sent to a following distance reference setup unit 16. This value is utilized for the calculation of a distance difference.

The following Table 1 shows the correspondence between the engine control methods to be selected by the condition discriminating unit 1 and the construction of the cascade control system.

TABLE 1

| ENGINE CONTROL METHODS | Construction | | |
|---|---|---|---|
| | Torque Servo System | Speed Servo System | Tracking Servo System |
| Acceleration Control | ○ | Δ | Δ |
| Deceleration Control | ○ | Δ | Δ |
| Fuel Cut-Off Control | ○ | — | — |
| Air-Fuel Ratio Control | ○ | ○ | ○ |
| Idle Speed Control | — | ○ | — |

Explanation
○ Great contribution
Δ Moderate contribution
— Small contribution

When the results of the condition discrimination indicates that the acceleration or deceleration control is needed, the torque servo system functions principally. At this time, the speed servo system also functions if the constant speed driving is being selected and also the tracking servo system functions if the distance sensor is in operation. The fuel cut-off control is performed within the range of the torque servo system. The air-fuel ratio control is performed during the torque servo system for the purpose of improving the fuel consumption and reducing the exhaust gas emission. The air-fuel ratio control functions effectively even during the constant speed driving as well as the tracking driving. In the case of the idle speed control, the speed servo system having the idle speed as the reference value functions.

The following Table 2 shows the results of the preference mode selection or input signals 18 to the condition discriminating unit 1.

TABLE 2

| Preference Node | Control System Construction | | |
|---|---|---|---|
| | Torque Servo System | Speed Servo System | Tracking Servo System |
| Sporty | ○ | — | — |
| Luxury | ○ | ○ | ○ |
| Economy | ○ | Δ | — |

○ Great contribution
Δ Moderate contribution
— Small contribution

As will be seen from Table 2, each of the sporty, luxury and economy modes corresponds mainly through changing of the control parameters of the torque servo system. As regards the "luxury" mode, coupled with the provision of the cruise control function and the distance sensor, the speed servo system and the tracking servo system function effectively.

In the case of the "economy" mode, while the speed servo system may be used jointly, a control algorithm is used which ensures saving of the fuel consumption even if the degree of the cruise control is reduced.

Figure 2:
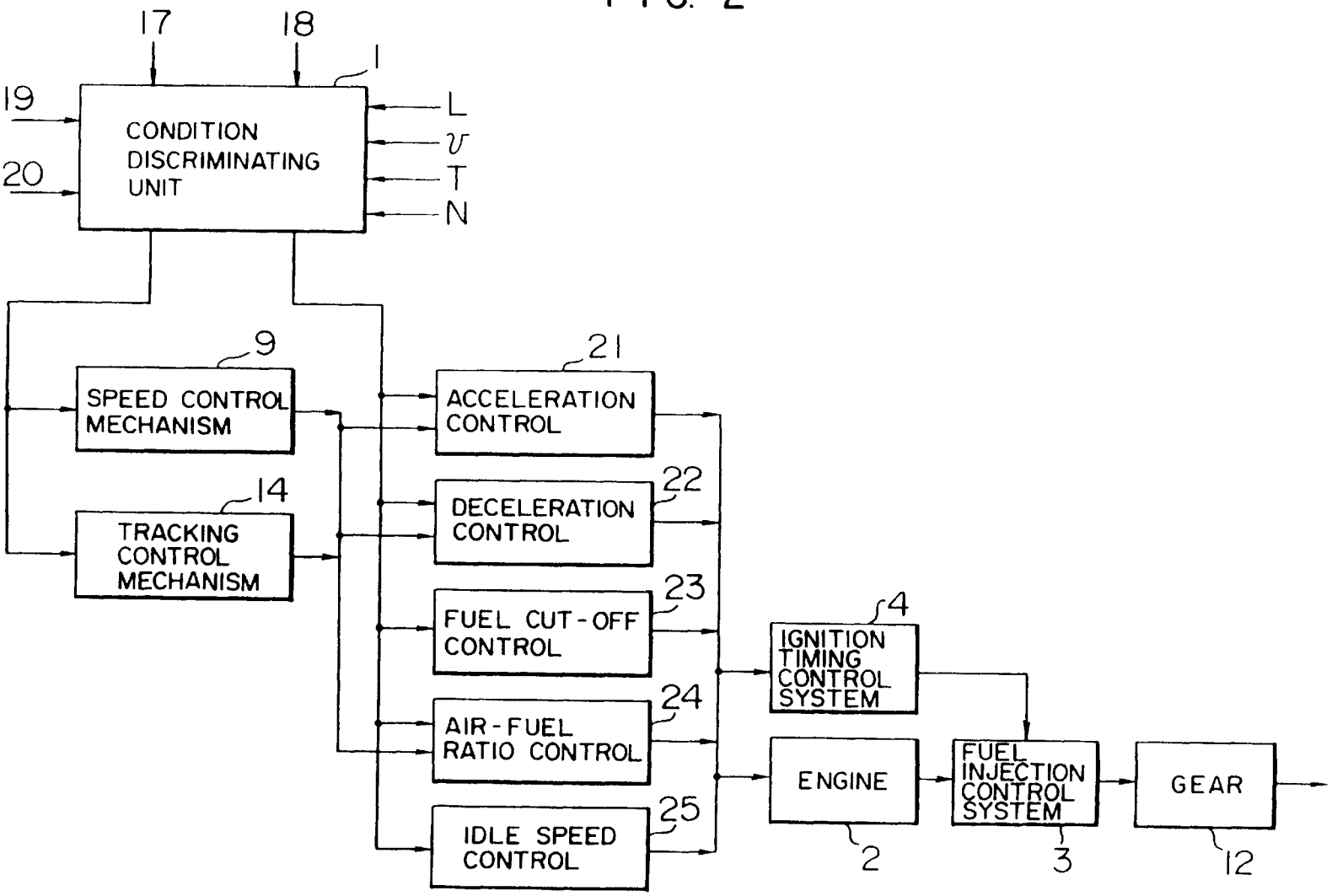
FIG. 2 is a block diagram showing another embodiment of the invention.

FIG. 2 shows another embodiment of the invention which has the same purposes as the embodiment of FIG. 1. FIG. 2 shows a construction in which the proper engine control method is selected from alternatives for the engine control methods in accordance with the discrimination result of the condition discriminating unit 1. The alternatives of the engine control methods include basically an acceleration control 21, deceleration control 22, fuel cut-off control 23, air-fuel ratio control 24 and idle speed control 25. Each of these five engine control methods is responsive to the results of calculations to supply a fuel quantity and an ignition timing to a fuel injection control system 3 and an ignition timing control system 4, respectively.

Where the acceleration control, the deceleration control or the fuel cut-off control is selected, rapid application of the control may have the danger of causing a surging phenomenon depending on the condition of the vehicle and therefore a predictive calculation is made on the basis of the vehicle condition and the selected control method. If the occurrence of a surging phenomenon is predicted, the air fuel-ratio control is selected or alternatively the parameter values of the already selected engine control method are changed.

Figure 3:
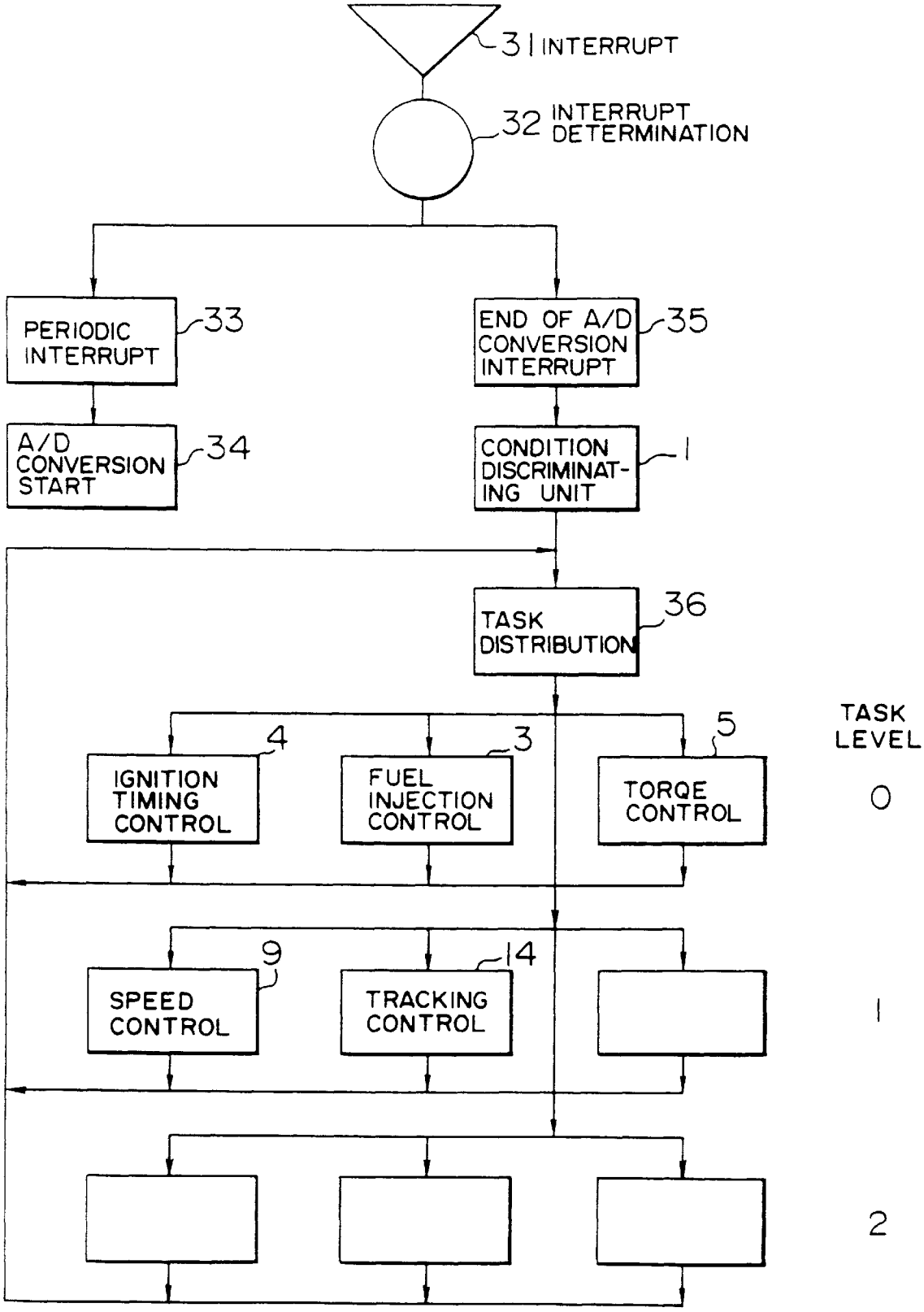
FIG. 3 is a block diagram showing an exemplary construction of the computer program used in the embodiment of FIG. 1.

The computer is essential for materializing the overall control relating to the engine as shown in FIG. 1. FIG. 3 shows the construction of the computer program.

The program shown in FIG. 3 is started at an interrupt step 31 and then at an interrupt decision step 32 a branching is made to a periodic interrupt step 33 or an end of A/D conversion interrupt step 35 which takes place after an A/D conversion start step 34 initiated by the interrupt step 33. After the end of A/D conversion interrupt step 35, the condition discrimination described in connection with FIG. 1 is performed and the proper engine control method is selected. In accordance with the selection result, a task distributing step 36 calls any of the following tasks. Assigned to a task level 0 are the ignition timing control 4, the fuel injection control 3 and the torque control 5 for rapid response purposes. Assigned to a task level 1 are the speed control 9, the tracking control 14, etc. Assigned to a task level 2, et seq., are the other programs which are allowed to respond more slowly.

From the present program construction point of view, there is a feature that when the vehicle condition and the driver's intent are subjected to A/D conversion and inputted, a condition discriminating step is performed thereby rapidly responding to the transient condition.

In accordance with the present invention, by virtue of the fact that the condition of a vehicle and the driver's intent can be detected rapidly from moment to moment and moreover the proper engine control method to be used in response to the detection results can be determined accurately, there is the effect of improving the driving performance, ensuring effective utilization of the engine performance, and rapidly developing engine control methods matched to different engine performances of different vehicles with the improved productivity of software therefor.

What is claimed is:

1. A condition adaptive-type control method for an internal combustion engine mounted on an automotive vehicle having a torque transmission mechanism, a brake pedal and an accelerator pedal, comprising the steps of:

categorizing driver's intents and vehicle conditions, respectively, into a plurality of categories, and preparing different engine control methods for different combinations of said categories;

detecting a driver's intent in accordance with the state of engagement or disengagement of said torque transmission mechanism, the angle of said brake pedal and the angle of said accelerator pedal;

detecting said vehicle condition from the speed of said vehicle; and selecting one of said engine control methods in accordance with a combination of the categories to which said detected driver's intent and vehicle condition belong.

2. A method according to claim 1, wherein said engine control methods differ by the fact that they refer to different parameter values.

3. A method according to claim 2, wherein said parameter values may be changed according to a driver's preference.

4. A method according to claim 1, wherein said detecting step is performed with a higher priority than other steps.

5. A method according to claim 1, wherein said selecting step further includes a step of anticipating the occurrence of a future phenomenon which is predicted to occur at a time when a selected control method is employed so as to select one engine control method in accordance with a result of said anticipating.

6. A condition adaptive-type control method for an internal combustion engine mounted on an automotive vehicle, comprising the steps of:

categorizing driver's intents and vehicle conditions into six categories and two categories, respectively, and preparing five types of engine control methods, including an acceleration control method, a deceleration control method, a fuel cut-off control method, an air/fuel ratio control method and an idle speed control method, which correspond to respective combinations of said categories;

detecting one of said six types of driver's intents including engaging or disengaging of a torque transmission mechanism, braking, transition or coasting, deceleration, running and acceleration;

detecting said vehicle condition including engine speed to determine whether said vehicle is in a rest condition or a running condition; and selecting one of said six types of engine control methods in accordance with said combination of categories to which said detected intent and vehicle condition belong.

7. A condition adaptive-type control system for an internal combustion engine mounted on an automotive vehicle, comprising:

a torque servo system including first reference setup means for setting up a first reference signal of an engine torque, torque measuring means measuring the actual torque of said engine, first comparing means for comparing said first reference signal with said measured torque so as to produce a first error signal indicative of a difference between said reference signal and said measured torque, and torque control means for producing a torque control signal in accordance with said first error signal;

a speed servo system including second reference setup means for setting up a second reference signal of a vehicle speed, vehicle speed measuring means for measuring an actual vehicle speed of said vehicle, second comparing means for comparing said second reference signal with said measured vehicle speed so as to produce a second error signal indicative of a difference between said second reference signal and said measured vehicle speed, and speed control means for producing a speed control signal in accordance with said second error signal;

said speed servo system including said torque servo system as a minor servo loop for said speed servo system;

a tracking servo system including third reference setup means for setting up a third reference signal of a distance to a forward vehicle, distance measuring means for measuring the actual distance to a forward vehicle, third comparing means for comparing said third reference signal with said measured distance so as to produce a third error signal indicative of a difference between said third reference signal and said measured distance, and tracking control means for producing a tracking control signal in accordance with said third error signal;

said tracking servo system including said speed servo system as a minor servo loop for said tracking servo system;

means for sensing an accelerator pedal angle;

means for sensing a brake pedal angle;

means for sensing engine speed;

means for detecting whether a torque transmission mechanism of said vehicle is engaged or disengaged;

a running control selector switch for selecting one of said servo systems;

condition discriminating means responsive to the outputs of said accelerator pedal angle sensing means, brake pedal angle sensing means, engine speed sensing means, torque transmission mechanism detecting means and said selector switch for categorizing a driver's intent and a vehicle condition in accordance with said outputs, for determining one engine control method among different engine control methods previously stored in said condition discriminating unit in accordance with a combination of said categories of said driver's intent and said vehicle condition, and for determining one servo system among said tracking servo system, speed servo system and said torque servo system in accordance with said output of said running control selector switch and said first, second and third reference signals so as to control said selected servo system to operate in accordance with said determined engine control method and to provide said reference signals to said reference setup units of the selected servo system; and engine control means for controlling fuel injection and ignition timing of said engine in response to said torque control signal from said torque servo system.

8. A condition adaptive-type control system according to claim 7, wherein said different engine control methods include an acceleration control method, a deceleration control method, a fuel cut-off method, an air/fuel ratio control method and an idle control method, said idle control method being operated with said speed servo system and the other four engine control methods being operated with said torque servo system.

9. A condition adaptive-type control method for an internal combustion engine mounted on an automotive vehicle having a torque transmission mechanism, a brake pedal and an accelerator pedal, comprising the steps of:

providing a plurality of different engine control methods for said engine, each of said different engine control methods including parameters and being associated with a combination of one of a plurality of vehicle conditions and one of a plurality of driver's intents;

discriminating said driver's intent by detecting the state of engagement or disengagement of said torque transmission mechanism, and by sensing the angle of said brake pedal and the angle of said accelerator pedal;

discriminating said vehicle condition by sensing the speed of said vehicle and determining whether said vehicle is in a rest condition or not; and selecting one of said engine control methods in accordance with a combination of the discriminated driver's intent and vehicle condition.

10. A method according to claim 9, wherein said step of discriminating said driver's intent further includes calculation of an acceleration rate of said vehicle on the basis of the sensed angle of said accelerator pedal.

11. A method according to claim 10, wherein said plurality of engine control methods include an acceleration control method, a deceleration control method, a fuel cut-off control method, an air-fuel ratio control method and an idle speed control method, and said step of selecting one of said engine control methods is executed by selectively choosing one of the following steps:

(1) selecting the acceleration control method when said torque transmission mechanism is engaged and said acceleration rate $\dot{\theta}ac$ is greater than a first reference value $\dot{\theta}aca$;

(2) selecting the deceleration control method when said torque transmission mechanism is engaged, the vehicle speed is greater than zero and either said acceleration rate $\dot{\theta}ac$ is equal to or smaller than a second reference value $\dot{\theta}acd$ or said acceleration pedal is released;

(3) selecting the fuel cut-off control method when said torque transmission mechanism is engaged, said acceleration pedal is released, and said engine speed is greater than a reference value;

(4) selecting the air-fuel ratio control method either when said torque transmission mechanism is engaged, said vehicle speed is greater than zero and said acceleration rate $\dot{\theta}ac$ is between the first and second reference values of $\dot{\theta}aca$ and $\dot{\theta}acd$, or when said torque transmission mechanism is disengaged and said acceleration pedal is depressed; and (5) selecting the idle speed control method when said torque transmission mechanism is disengaged and said acceleration pedal is released.

12. A method according to claim 9, wherein each of said engine control methods further includes a step of updating values of said parameters in accordance with each combination of the engine condition and the driver's intent.

13. A condition adaptive-type control method for an internal combustion engine mounted on an automotive vehicle having a torque transmission mechanism, a brake pedal and an accelerator pedal, comprising the steps of:

programming a plurality of different engine control methods with parameters for said engine, each of said different engine control methods being associated with a combination of one of a plurality of vehicle conditions and one of a plurality of driver's intents, including braking, coasting, transient operation, decelerating, cruising and accelerating;

discriminating the driver's intent by detecting the state of engagement or disengagement of said torque transmission mechanism, the angle of said brake pedal and the angle of said accelerator pedal;

discriminating said vehicle condition by detecting engine speed and determining whether said vehicle is in a rest condition or not; and selecting one of said engine control methods in accordance with a combination of the discriminated driver's intent and vehicle condition.

*14. A condition adaptive-type control system for an internal combustion engine mounted on an automotive vehicle having a torque transmission mechanism, a brake pedal and an accelerator pedal, comprising:*

*means for categorizing driver's intents and vehicle conditions, respectively, into a plurality of categories, and for preparing different engine control methods for different combinations of said categories;*

*means for detecting a driver's intent in accordance with the state of said torque transmission mechanism, the angle of said brake pedal and the angle of said accelerator pedal;*

*means for detecting said vehicle condition from the speed of said vehicle; and*

*means for selecting one of said engine control methods in accordance with a combination of the categories to which said detected driver's intent and vehicle condition belong.*

*15. A condition adaptive-type control system according to claim 14, further includes means for differentiating said engine control methods in a manner that they refer to different parameter values.*

*16. A condition adaptive-type control system according to claim 15, further includes means for changing said parameter values according to a driver's preference.*

*17. A condition adaptive-type control system according to claim 14, further includes means for performing detecting operations of both said detecting means prior to other means.*

*18. A condition adaptive-type control system according to claim 14, further includes means for anticipating the occurrence of a future phenomenon which is predicted to occur at a time when a selected control method is employed so as to select one engine control method in accordance with a result of said anticipating.*

*19. A condition adaptive-type control system for an internal combustion engine mounted on an automotive vehicle comprising:*

*means for categorizing driver's intents and vehicle conditions into six categories and two categories, respectively, and for preparing five types of engine control methods, including an acceleration control method, a deceleration control method, a fuel cut-off control method, an air/fuel ratio control method and and idle speed control method, which correspond to respective combinations of said categories;*

*means for detecting one of said six types of driver's intents including a torque transmission mechanism, braking, transition or coasting, deceleration, running and acceleration;*

*means for detecting said vehicle condition including engine spew to determine whether said vehicle is in a rest condition or a running condition; and*

*means for selecting one of said five types of engine control methods in accordance with said combination of categories to which said detected intent and vehicle condition belong.*

*20. A condition adaptive-type control system for an internal combustion engine mounted on an automotive vehicle having a torque transmission mechanism, a brake pedal and an accelerator pedal, comprising:*

*means for providing a plurality of engine control methods for said engine, each of said different engine control methods including parameters and being associated with a combination of one of a plurality of vehicle conditions and one of a plurality of driver's intents;*

*means for discriminating said driver's intent by detecting the state of said torque transmission mechanism, and by sensing the angle of said brake pedal and the angle of said accelerator pedal;*

*means for discriminating said vehicle condition by sensing the speed of said vehicle and for determining whether said vehicle is in a rest condition or not; and*

*means for selecting one of said engine control methods in accordance with a combination of the discriminated driver's intent and vehicle condition.*

*21. A condition adaptive-type control system according to claim 20, wherein said means for discriminating said driver's intent includes means for calculating an acceleration rate of said vehicle on the basis of the sensed angle of said acceleration pedal.*

*22. A condition adaptive-type control system according to claim 21, wherein said plurality of engine control methods include an acceleration control method, a deceleration control method, a fuel cut-off control method, an air-fuel ratio control method and an idle speed control method, and said selecting means includes:*

*means for selecting the acceleration control method when said torque transmission mechanism is engaged and said acceleration rate θac is greater than a first reference value θaca;*

*means for selecting the deceleration control method when said torque transmission mechanism is engaged, the vehicle speed is greater than zero and either said acceleration rate θac is equal to or smaller than a second reference value θacd or said acceleration pedal is released;*

*means for selecting the fuel cut-off control method when said torque transmission mechanism is engaged, said acceleration pedal is released, and said engine speed is greater than a reference value;*

*means for selecting the air-fuel ratio control method either when said torque transmission mechanism is engaged, said vehicle speed is greater than zero and said acceleration rate θac is between the first and second reference values of θaca and θacd, or when said torque transmission mechanism is disengaged and said acceleration pedal is depressed; and*

*means for selecting the idle speed control method when said torque transmission mechanism is disengaged and said acceleration pedal is released.*

*23. A condition adaptive-type control system according to claim 20, further includes means for updating values of said parameters in each of said engine control methods in accordance with each combination of the engine condition and the driver's intent.*

*24. A condition adaptive-type control system for an internal combustion engine mounted on an automotive vehicle having a torque transmission mechanism, a brake pedal and an accelerator pedal, comprising:*

*means for programming a plurality of engine control methods with parameters for said engine, each of said different engine control methods being associated with a combination of one of a plurality of vehicle conditions and one of a plurality of driver's intents, including braking, coasting, transient operation, decelerating, cruising and accelerating;*

*means for discriminating said driver's intent by detecting the state of said torque transmission mechanism, the angle of said brake pedal and the angle of said accelerator pedal;*

*means for discriminating said vehicle condition by detecting the engine speed and determining whether said vehicle is in a rest condition or not; and*

*means for selecting one of said engine control methods in accordance with a combination of the discriminated driver's intent and vehicle condition.*

*25. A condition adaptive-type control method for an internal combustion engine mounted on an automotive vehicle, comprising the steps of:*

*categorizing driver's intents and vehicle conditions into plural categories and plural categories, respectively, and preparing plural types of engine control methods, including an acceleration control method, a deceleration control method, an air/fuel ratio control method and an idle speed control method, which correspond to respective combinations of said categories;*

*detecting one of said plural types of driver's intents including braking, transition or coasting, deceleration, running and acceleration;*

*detecting said vehicle condition including engine speed to determine whether said vehicle is in a rest condition or a running condition; and*

*selecting one of said plural types of engine control methods in accordance with said combination of categories to which said detected intent and vehicle condition belong.*

*26. A condition adaptive-type control system for an internal combustion engine mounted on an automotive vehicle comprising:*

*means for categorizing driver's intents and vehicle conditions into plural categories, respectively, and for preparing plural types of engine control methods, including an acceleration control method, a deceleration control method, an air/fuel ratio control method and an idle speed control method, which correspond to respective combinations of said categories;*

*means for detecting one of said plural types of driver's intents including braking, transition or coasting, deceleration, running and acceleration;*

*means for detecting said vehicle condition including engine speed to determine whether said vehicle is in a rest condition or a running condition; and*

*means for selecting one of said plural types of engine control methods in accordance with said combination of categories to which said detected intent and vehicle condition belong.*

*27. A condition adaptive-type control method for an internal combustion engine mounted on an automotive vehicle having driver controlled elements, comprising the steps of:*

*detecting a driver's action in controlling said elements;*

*detecting a driver's preference from at least one switch set by the driver, said one switch being a switch for setting a cruise control for said engine;*

*detecting whether a distance to a forward vehicle is within a predetermined distance or not; and*

*outputting a control signal for the engine in accordance with the results of said steps, the outputted control signal being one for changing from the cruise control to a tracking control for tracking the forward vehicle with said predetermined distance when it is detected by said detecting steps that said cruise control switch is set and the distance is within said predetermined distance.*

*28. A condition adaptive-type control method according to claim 27, further comprises a step of detecting a vehicle speed, and a step of determining said predetermined distance in accordance with the detected vehicle speed.*

*29. A condition adaptive-type control method for an internal combustion engine mounted on an automotive vehicle having driver controlled elements, comprising:*

*means for detecting a driver's action in controlling said elements;*

*means for detecting a driver's preference from at least one switch set by the driver, said one switch being a switch for setting a cruise control for said engine;*

*means for detecting whether a distance to a forward vehicle is within a predetermined distance or not; and*

*means for outputting a control signal for the engine in accordance with the detected driver's action, driver's preference and distance, the outputted control signal being one for changing from the cruise control to a tracking control for tracking the forward vehicle with said predetermined distance when it is detected by said detecting means that said cruise control switch is set and the distance is within said predetermined distance.*

*30. A condition adaptive-type control system according to claim 29, further comprises means for detecting a vehicle speed, and means for determining said predetermined distance in accordance with the detected vehicle speed.*

*31. A condition adaptive-type control method for an internal combustion engine mounted on an automotive vehicle having driver controlled elements, comprising the steps of:*

*categorizing driver's action and vehicle conditions, respectively, into a plurality of categories, and preparing different engine control methods for different combinations of said categories;*

*detecting said driver's action in controlling said elements;*

*detecting said vehicle condition from an operational parameter of said vehicle;*

*selecting one of said engine control methods in accordance with a combination of the categories to which said detected driver's action and vehicle condition belong; and*

*detecting a driver's preference from at least one switch set by the driver, wherein said categorizing step includes a step of categorizing said driver's action, said vehicle conditions and said driver's preference respectively, into a plurality of categories, and a step of preparing different engine control methods for different combinations of said categories, and said selecting step includes a step of selecting one of said engine control methods in accordance with a combination of the categories to which said detected driver's action, vehicle condition and driver's preference belong.*

*32. A condition adaptive-type control system for in internal combustion engine mounted on an automotive vehicle having driver controlled elements comprising:*

*means for categorizing driver's action and vehicle conditions, respectively, into a plurality of categories, and for preparing different engine control methods for different combinations of said categories;*

*means for detecting said driver's action in controlling said elements;*

*means for detecting vehicle conditions from at least one operational parameter of said vehicle; and*

*means for selecting one of said engine control methods in accordance with a combination of the categories to which said detected driver's action and vehicle condition belong.*

*33. A condition adaptive-type control system according to claim 31, further comprising means for detecting a driver's preference from at least one switch set by the driver, wherein said categorizing means includes means for categorizing said driver's action, said vehicle conditions and said driver's preference respectively, into a plurality of categories, and for preparing different engine control methods for different combinations of said categories, and said selecting step includes a step of selecting one of said engine control methods in accordance with a combination of the categories to which said detected driver's action, vehicle condition and driver's preference belong.*

*34. A condition adaptive-type control method according to claim 36, further comprising a step of detecting a driver's preference from switches set by the driver, wherein said selecting step includes a step of selecting one of said engine control methods in accordance with said detected driver's action, vehicle condition and driver's preference.*

*35. A condition adaptive-type control method according to claim 34, wherein the driver's preference detected from said switches is one of sporty, luxury and economy modes of driving.*

*36. A condition adaptive-type control method for an internal combustion engine mounted on an automotive vehicle having different engine control methods and driver controlled elements, comprising the steps of:*

*detecting a driver's action in controlling said elements;*

*detecting a vehicle condition from an operational parameter of said vehicle; and*

*selecting one of said engine control methods in accordance with combination of said detected driver's action and vehicle condition;*

*wherein said engine control methods include an acceleration control method, a deceleration control method, a fuel cut-off control method, an air-fuel ratio control method and an idle speed control method; and*

*wherein said engine control methods are composed of the combinations of torque servo, speed servo and tracking servo systems.*

*37. A condition adaptive-type control method for an internal combustion engine mounted on an automotive vehicle having different engine control methods and driver controlled elements, comprising the steps of:*

*detecting a driver's action in controlling said elements;*

*detecting a vehicle condition from an operational parameter of said vehicle;*

*selecting one of said engine control methods in accordance with combination of said detected driver's action and vehicle condition; and*

*detecting a driver's preference from switches set by the driver, wherein said selecting step includes a step of selecting one of said engine control methods in accordance with said detected driver's action, vehicle condition and driver's preference;*

*wherein said engine control methods include an acceleration control method, a deceleration control method, a fuel cut-off control method, an air-fuel ratio control method and an idle speed control method, and the driver's preference detected from said switches is one of sporty, luxury and economy modes of driving.*

*38. A condition adaptive-type control method according to claim 37, wherein said engine control methods are composed of the combinations of torque servo, speed servo and tracking servo systems selected in accordance with said detected driver's preference.*

*39. A condition adaptive-type control system for an internal combustion engine mounted on an automotive vehicle having different engine control methods and driver controlled elements comprising:*

*means for detecting a driver's action in controlling said elements;*

*means for detecting a vehicle condition from an operational parameter of said vehicle; and*

*means for selecting one of said engine control methods in accordance with a combination of said detected driver's action and vehicle condition; and*

*means for detecting a driver's preference from switches set by the driver;*

*wherein said selecting means includes means for selecting one of said engine control methods in accordance with said detected driver's action, vehicle condition and driver's preference.*

*40. A condition adaptive-type control system according to claim 39, wherein said engine control methods include an acceleration control method, a deceleration control method, a fuel cut-off control method, an air-fuel ratio control method and an idle speed control method, and the driver's preference detected from said switches is one of sporty, luxury and economy modes of driving.*

*41. A condition adaptive-type control system for an internal combustion engine mounted on an automotive vehicle having different engine control methods and driver controlled elements comprising:*

*means for detecting a driver's action in controlling said elements;*

*means for detecting a vehicle condition from an operational parameter of said vehicle; and*

*means for selecting one of said engine control methods in accordance with a combination of said detected driver's action and vehicle condition;*

*wherein said engine control methods include an acceleration control method, a deceleration control method, a fuel cut-off control method, an air-fuel ratio control method and an idle speed control method; and*

*wherein said engine control methods are composed of the combinations of torque servo, speed servo and tracking servo systems.*

*42. A condition adaptive-type control system for an internal combustion engine mounted on an automotive vehicle having different engine control methods and driver controlled elements comprising:*

*means for detecting a driver's action in controlling said elements;*

*means for detecting a vehicle condition from an operational parameter of said vehicle;*

*means for selecting one of said engine control methods in accordance with a combination of said detected driver's action and vehicle condition; and*

*means for detecting a driver's preference from switches set by the driver, wherein said selecting means includes means for selecting one of said engine control methods in accordance with said detected driver's action, vehicle condition and driver's preference;*

*wherein said engine control methods include an acceleration control method, a deceleration control method, a fuel cut-off control method, an air-fuel ratio control method and an idle speed control method.*

*43. A condition adaptive-type control system according to claim 42, wherein the driver's preference detected from said switches is one of sporty, luxury and economy modes of driving.*

*44. A condition adaptive-type control method for an internal combustion engine mounted on an automotive vehicle having different engine control methods and driver controlled elements comprising:*

*means for detecting a driver's action in controlling said elements;*

*means for detecting a vehicle condition from an operational parameter of said vehicle;*

*means for selecting one of said engine control methods in accordance with a combination of said detected driver's action and vehicle condition; and*

*means for detecting a driver's preference from switches set by the driver, wherein said selecting means includes means for selecting one of said engine control methods in accordance with said detected driver's action, vehicle condition and driver's preference;*

*wherein said engine control methods include an acceleration control method, a deceleration control method, a fuel cut-off control method, an air-fuel ratio control method and an idle speed control method, and the driver's preference detected from said switches is one of sporty, luxury and economy modes of driving; and*

*wherein said engine control methods are composed of the combinations of torque servo, speed servo and tracking servo systems selected in accordance with said detected driver's preference.*

*45. A condition adaptive-type control method for an internal combustion engine mounted on an automotive vehicle having torque servo, speed servo and tracking servo systems and reference setup units, comprising the steps of:*

*setting up a first reference signal of an engine torque, measuring the actual torque of said engine, comparing said first reference signal with said measured torque so as to produce a first error signal indicative of a*

*difference between said reference signal and said measured torque, and producing a torque control signal in accordance with said first error signal;*

*setting up a second reference signal of a vehicle speed, measuring an actual vehicle speed of said vehicle, comparing said second reference signal with said measured vehicle speed so as to produce a second error signal indicative of a difference between said second reference signal and said measured vehicle speed, and producing a speed control signal corresponding to said first error signal in accordance with said second error signal;*

*setting up a third reference signal of a distance to a forward vehicle, measuring the actual distance to a forward vehicle, comparing said third reference signal with said measured distance so as to produce a third error signal indicative of a difference between said third reference signal and said measured distance, and producing a tracking control signal corresponding to said second error signal in accordance with said third error signal;*

*detecting an output of a running control selector switch for selecting one of said servo systems;*

*determining one servo system among said tracking servo system, speed servo system and said torque servo system in accordance with said output of said running control selector switch and said first, second and third reference signals so as to control said selected servo system to provide said reference signals to said reference setup units of the selected servo system; and*

*controlling fuel injection and/or ignition timing of said engine in response to said torque control signal from said torque servo system.*

*46. A condition adaptive-type control method for an internal combustion engine mounted on an automotive vehicle, having driver controlled elements, torque servo, speed servo and tracking servo systems, reference setup units, a condition discriminating unit, and different engine control methods comprising the steps of:*

*setting up a first reference signal of an engine torque, measuring the actual torque of said engine, comparing said first reference signal with said measured torque so as to produce a first error signal indicative of a difference between said reference signal and said measured torque, and producing a torque control signal in accordance with said first error signal;*

*setting up a second reference signal of a vehicle speed, measuring an actual vehicle speed of said vehicle, comparing said second reference signal with said measured vehicle speed so as to produce a second error signal indicative of a difference between said second reference signal and said measured vehicle speed, and producing a speed control signal corresponding to said first error signal in accordance with said second error signal;*

*setting up a third reference signal of a distance to a forward vehicle, measuring the actual distance to a forward vehicle, comparing said third reference signal with said measured distance so as to produce a third error signal indicative of a difference between said third reference signal and said measured distance, and producing a tracking control signal corresponding to said second error signal in accordance with said third error signal;*

*categorizing driver's action and vehicle conditions, respectively, into a plurality of categories, and preparing different engine control methods for different combinations of said categories;*

*detecting said driver's action in controlling said elements;*

*detecting said vehicle condition from an operational parameter of said vehicle; and*

*detecting an output of a running control selector switch for selecting one of said servo systems; determining one engine control method among different engine control methods previously stored in said condition discriminating unit in accordance with a combination of said categories of said driver's action and said vehicle condition, and determining one servo system among said tracking servo system, speed servo system and said torque servo system in accordance with said output of said running control selector switch and said first, second and third reference signals so as to control said selected servo system to operate in accordance with said determined engine control method and to provide said reference signals to said reference setup units of the selected servo system; and*

*controlling fuel injection and/or ignition timing of said engine in response to said torque control signal from said torque servo system.*

*47. A condition adaptive-type control method according to claim 46, wherein said different engine control methods include an acceleration control method, a deceleration control method, a fuel cut-off method, an air/fuel ratio control method and an idle control method, said idle control method being operated with said speed servo system and the other four engine control methods being operated with said torque servo system.*

*48. A vehicle comprising:*

*first subsystem which includes means for detecting a driver's behavior, means for detecting a vehicle condition and means for detecting an environmental condition and for generating a signal in accordance with the output of said detecting means; and*

*a second subsystem which controls the vehicle in accordance with said signal;*

*wherein said environmental condition is given by a signal of a distance between the vehicle and an obstacle and/or a preceding vehicle detected by a distance sensor provided for the vehicle;*

*wherein said first subsystem includes driver's preference selector switches and generates the signal for said second subsystem in accordance with a signal given by one of said selector switches.*

*49. An adaptive control system for an automotive vehicle having driver controlled elements comprising:*

*first subsystem which includes means for detecting a driver's behavior in controlling said elements, means for detecting a vehicle condition from an operational parameter of said vehicle and means for detecting an environmental condition, generates a reference signal in accordance with the output of said detecting means; and*

*second subsystem which includes a feedback control, controls the vehicle in accordance with said reference signal a feedback signal corresponding to said control;*

*wherein said environmental condition is given by a signal of a distance between the vehicle and an obstacle and/or a preceding vehicle detected by a distance sensor provided for the vehicle;*

*wherein said first subsystem includes driver's preference selector switches and generates the signal for said second subsystem in accordance with a signal given by one of said selector switches.*

* * * * *